United States Patent [19]

Ruehl

[11] Patent Number: 5,236,283
[45] Date of Patent: Aug. 17, 1993

[54] METHOD OF DISPOSING OF EARTH CONTAMINATED BY LEAKING UNDERGROUND STORAGE TANKS

[76] Inventor: Paul A. Ruehl, 25220 Pennie, Dearborn Heights, Mich. 48125

[21] Appl. No.: 852,316

[22] Filed: Mar. 18, 1992

[51] Int. Cl.$^5$ ................................................ B09B 3/00
[52] U.S. Cl. .................................... 405/129; 405/128; 588/252
[58] Field of Search ............... 405/128, 129, 131, 258, 405/263, 266, 52; 588/249, 252

[56] References Cited

U.S. PATENT DOCUMENTS

| | | | |
|---|---|---|---|
| 4,913,586 | 4/1990 | Gabbita | 405/129 |
| 4,927,293 | 5/1990 | Campbell | 405/128 |
| 5,039,415 | 8/1991 | Smith | 405/128 X |
| 5,088,856 | 2/1992 | Yocum | 405/128 |
| 5,098,224 | 3/1992 | Netzel et al. | 405/128 |

Primary Examiner—David H. Corbin
Attorney, Agent, or Firm—Brooks & Kushman

[57] ABSTRACT

Process for disposing of clay, shale or sand containing earth contaminated with petroleum products from leaking underground storage tanks (LUST) as disclosed. The LUST and surrounding contaminated earth is excavated. The clay or shale is separated from the other materials and transported to a site of a cement plant. The non-clay or non-shale material is disposed of in a non-hazardous landfill. The clay or shale is mixed with other cement precursor raw materials and the mixture is ground to form a cement feed mix. The feed mix is introduced into a rotary cement kiln causing any remaining petroleum product contained therein to be volatilized and burned within the kiln as the cement clinker is formed. The clinker is then ground for the purpose of forming cement free of petroleum product.

11 Claims, 4 Drawing Sheets

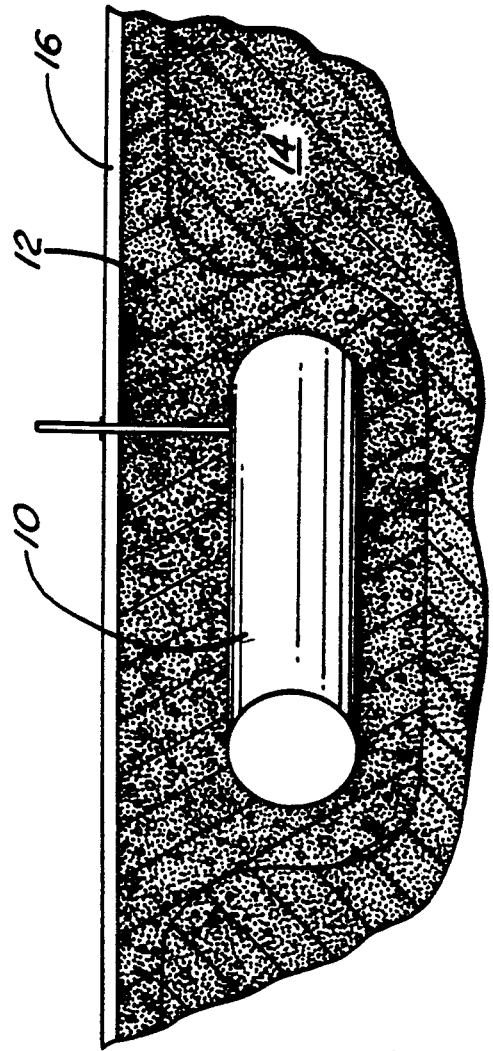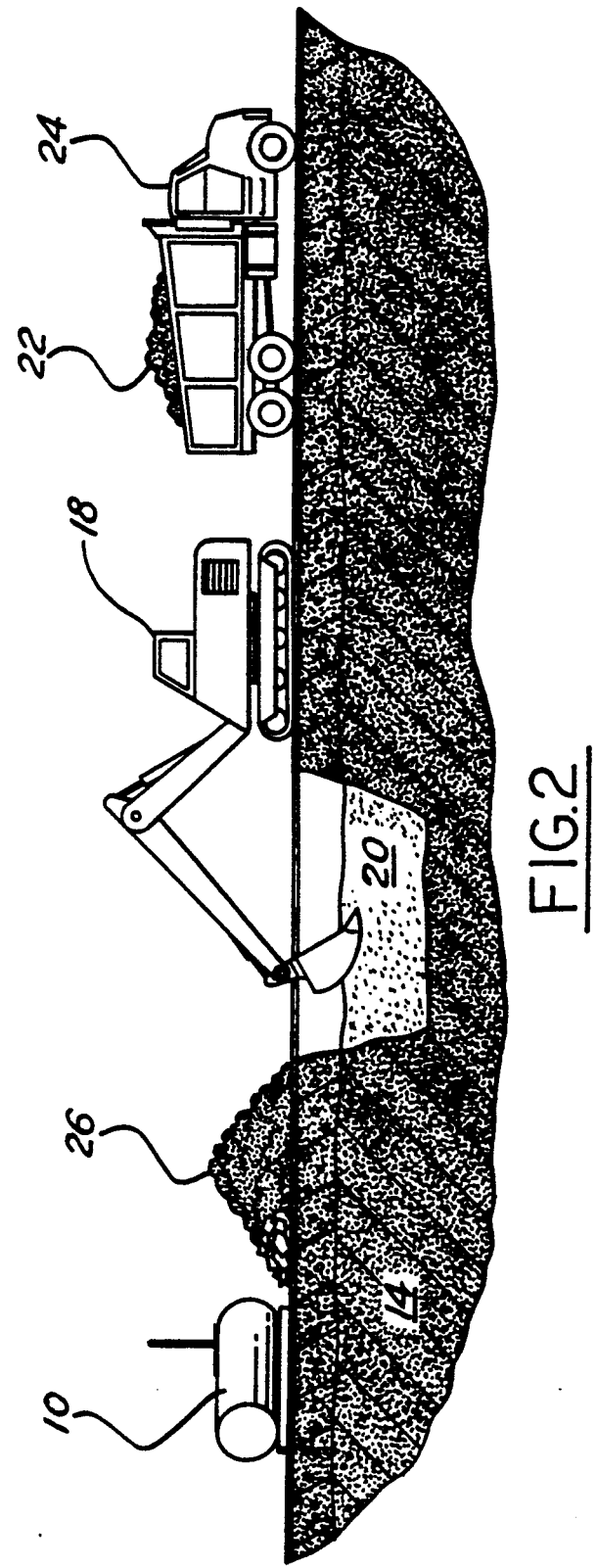

METHOD OF DISPOSING OF EARTH CONTAMINATED BY LEAKING UNDERGROUND STORAGE TANKS

TECHNICAL FIELD

The present invention relates to disposal of earth and material contaminated with organic materials and more particularly, to earth and material containing clay, shale or sand contaminated by leaking underground storage tanks.

BACKGROUND ART

At the present time, substantially all earth and materials removed from leaking underground storage tank (LUST) remediation cites is disposed of in Type II, non-hazardous landfill sites. With the rising cost of solid waste disposal, the ever decreasing number of available landfill sites, and the increasing number of LUST remediation sites, the disposal of contaminated earth has become a very significant economic and environmental problem. The disposal of earth contaminated by petroleum products in landfills is, at the present time, the least expensive viable disposable alternative. However, disposal in landfills is acknowledged by several environmental agencies as the least environmentally favorable remedial action alternative. Even in Type II, non-hazardous landfill, some leaching inevitably occurs resulting in the petroleum products contained in the contaminated earth gradually evaporating into the atmosphere or leaching into the water system.

For some time, rotary cement kilns have been utilized for the purpose of disposing of hazardous organic waste and toxic metals. In the case of waste containing hazardous toxic metals, the toxic metals become encapsulated in the cement clinker and ultimately in the cement. At instances of high toxic metal concentration, the cement products are merely used to stabilize the waste and enable the waste to be disposed of in a hazardous landfill site. In other instances where the toxic metal content is relatively low, there have been proposals to actually utilize the toxic metal containing cement clinker to make commercial Portland cement. U.S. Pat. No. 4,984,983, Enkegaard, and U.S. Pat. No. 4,921,538, Lafser, Jr. et al., illustrate prior uses of rotary cement kilns in the disposal of toxic waste.

An object of the present invention is to reduce the volume of earth from LUST remediation sites which need to be disposed of in Type II landfills.

Another object of the present invention is to form Portland cement from clay, shale or sand removed from LUST remediation sites which are contaminated with petroleum products and are qualified as non-hazardous solid waste products pursuant to 40 CFR §261.4(d)(10) (Jul. 1, 1990 edition).

An advantage of the present process is that limited landfill space is not needlessly used by petroleum product contaminated clay, shale and sand, and the need to mine clay and shale to supply cement plants is also reduced.

These and other objects, features and advantages of the present invention will be readily apparent from the attached drawings and described in the accompanying specification.

DISCLOSURE OF INVENTION

The process of the present invention is useful for disposing of earth contaminated with petroleum products from leaking underground storage tanks (LUST). When the LUST and the surrounding contaminated earth is excavated, the clay, shale or sand is separated from the other material and transported to the site of a cement plant. The clay is then mixed with other precursor raw materials and ground to form a feed mix. The feed mix is introduced into a rotary cement kiln, causing any remaining petroleum products contained therein to be volatilized and burned within the kiln as cement clinker is produced. The cement clinker is then ground to form cement which is free of petroleum product. The process can be used to dispose of contaminated shale and sand as well as clay. Both clay and shale are primarily comprised of a mixture of one part $Al_2O_3$ to two or three parts of $SiO_2$. Preferably, the clay is disposed of utilizing a wet cement making process while the shale is disposed of utilizing a dry cement making process.

BRIEF DESCRIPTION OF THE DRAWINGS

FIG. 1 is a schematic side cross-sectional illustration of an underground storage tank and the surrounding earth;

FIG. 2 is a side elevation of a LUST site being remediated;

BEST MODE FOR CARRYING OUT THE INVENTION

Figure 3A:
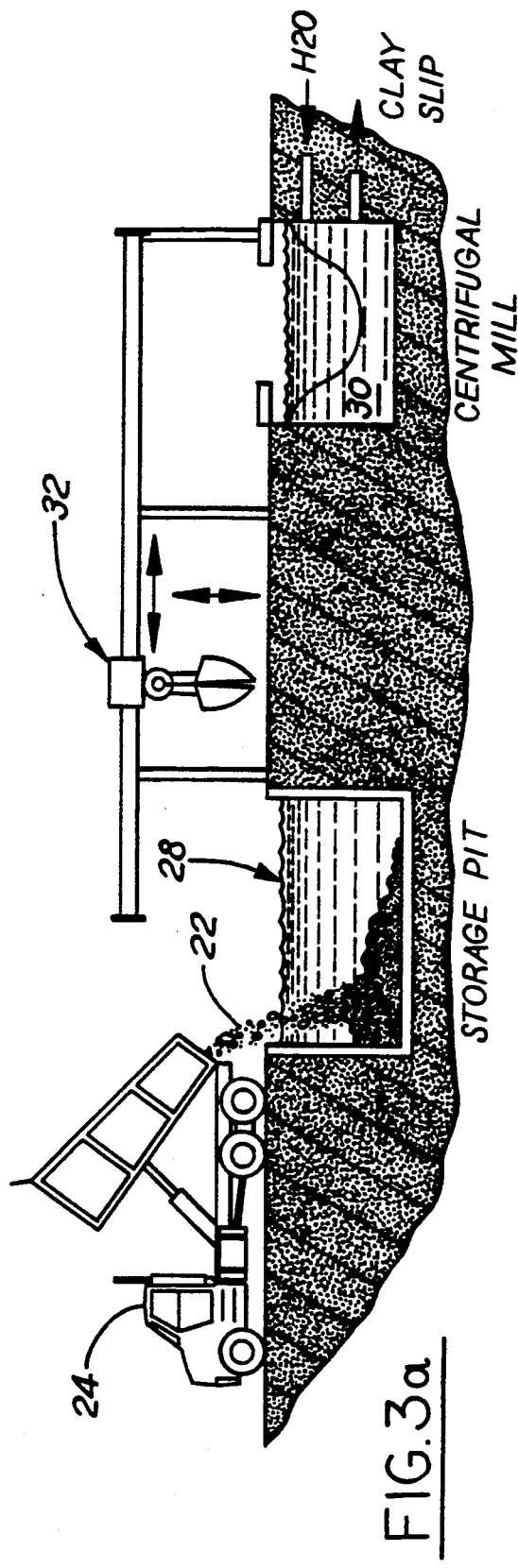
FIG. 3a is a side illustration of a clay storage pit at a cement plant.

The process of the present invention is for disposing of earth contaminated with petroleum products from leaking underground storage tanks. An underground storage tank and a storage tank remediation site are illustrated in FIGS. 1 and 2. Underground storage products tanks commonly used for storing gasoline, diesel fuel and fuel oil, are currently the cause of a great deal of environmental concern. Petroleum products from leaking underground storage tanks are gradually leaching into and contaminating our ground water. As a result of increasing age of steel fuel storage tanks and more stringent state and federal standards requiring the removal of leaking tanks and the remediation of the site, the disposal of contaminated earth has become a significant problem.

FIG. 1 schematically illustrates an underground storage tank and immediately surrounding the LUST 10 is a layer of sand and gravel 12. The LUST 10 is below grade in a shallow pit formed in the earth 14. The LUST 10 is covered with a relatively thick layer of sand and gravel and the site is typically capped with a layer of asphalt 16. There is no practical way of repairing LUST in place and the most common remediation process requires that the LUST be removed and all of the petroleum contaminated earth excavated and removed from the site.

CLAY DISPOSAL

FIG. 2 illustrates a conventional shovel or back hoe 18 removing soil from a pit 20 from which the LUST has been removed. The operator shovel 18 carefully sorts the material excavated from the pit into two categories. The operation puts clay 22 in one pile, in this case, within truck 24 and stores non-clay materials 26, separately. Separation in this gross level is sufficient, it is not necessary to completely remove all sand and loam from the clay. The clay is then transported to the site of a wet process cement plant and non-clay material 26 is transported to a non-hazardous landfill site.

Clay 22, when at the wet process cement plant site, is deposited in a clay storage pit 28 as illustrated in FIG. 3a. Clay storage pits of this type are quite common and conventionally used in wet process cement plants. Pit 28 is a large lined pit which is partially filled with water. The clay, when deposited in the pit, begins to absorb water waiting further processing. As needed, clay will be transported from pit 28 to centrifugal mill 30 by a clam shell bucket 32 which translates along an overhead beam. Centrifugal mill 30 mixes the clay with water and forces the clay through a series of holes in a rotating drum to form a fluid clay slip. The clay slip is then pumped to the wet slurry grinding mill illustrated in FIG. 3b.

Figure 3B:
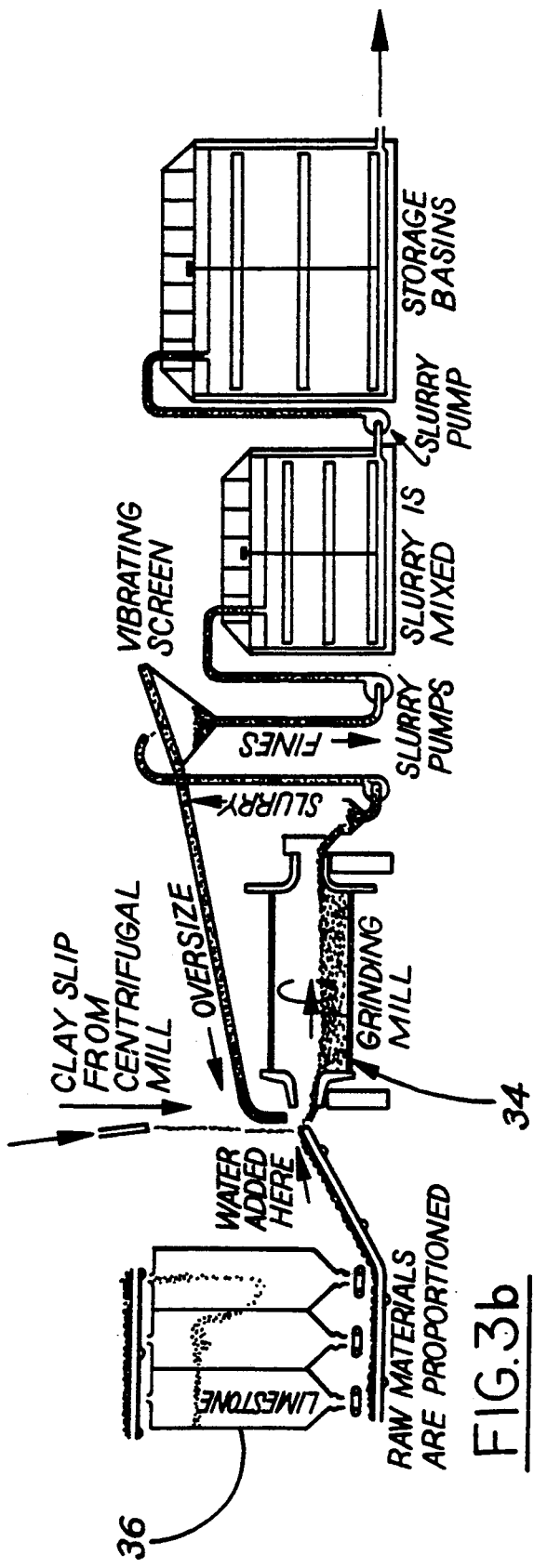
FIG. 3b is a schematic illustration of a section of a wet process cement plant used to form the feed slurry.

Wet slurry grinding mill 34 mixes the clay slip with other precursor raw materials used for making cement. The largest additional raw material is limestone. However, additional raw materials such as iron or silica sand as well as numerous other materials are added in order to make adjustments to the finished slurry composition. These other cement precursor raw materials are stored in a series of silos 36 and transported to grinding mill 40 in a conventional manner as schematically illustrated in FIG. 3b.

Figure 3C:
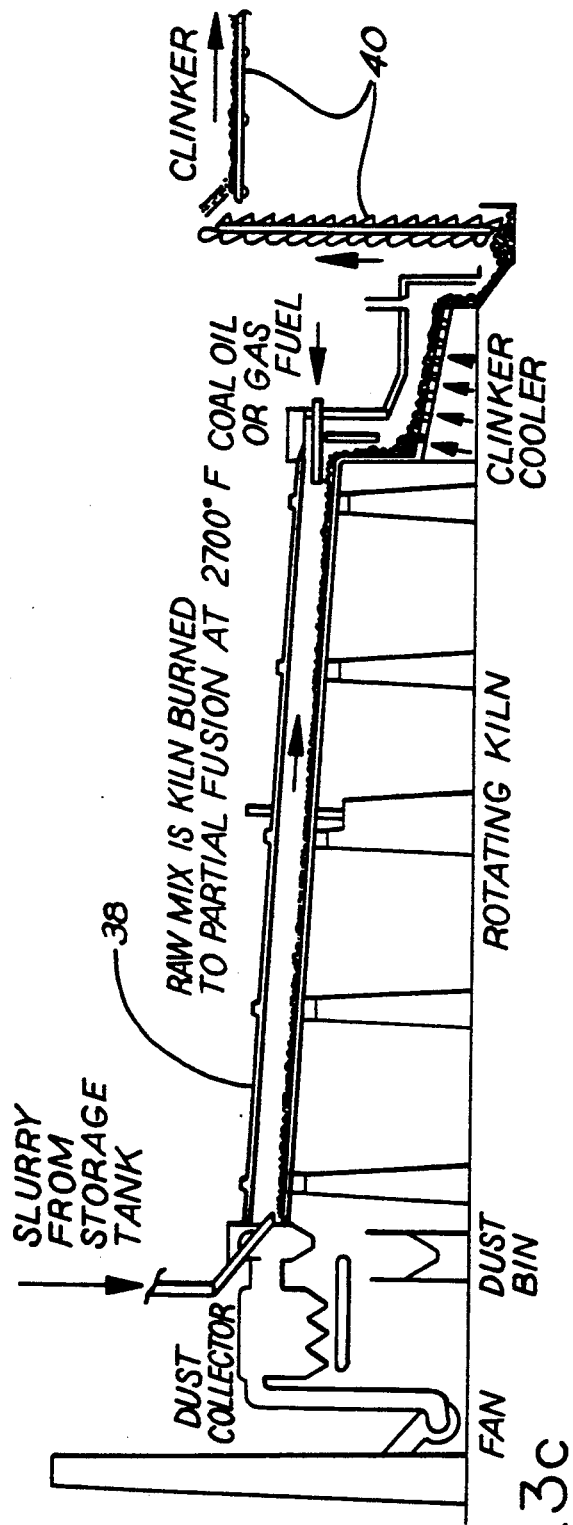
FIG. 3c is a schematic illustration of a rotary kiln portion of a wet process cement plant.

The slurry output from the grinding mill is then carefully screened and mixed prior to storage in a holding tank waiting usage. The feed slurry is next introduced into a heated rotary cement kiln, in a conventional manner as illustrated in FIG. 3c. The temperature of the kiln causes any remaining petroleum product in the slurry to be volatized and burned as cement clinker is produced. Raw mix kiln 38 typically will operate at a temperature of approximately 2750° F. in order to achieve proper calcination of the clinker. These operating temperatures burn off all of the hydrocarbons contained in the petroleum products resulting in the production of clinker which is free of petroleum products.

Figure 3D:
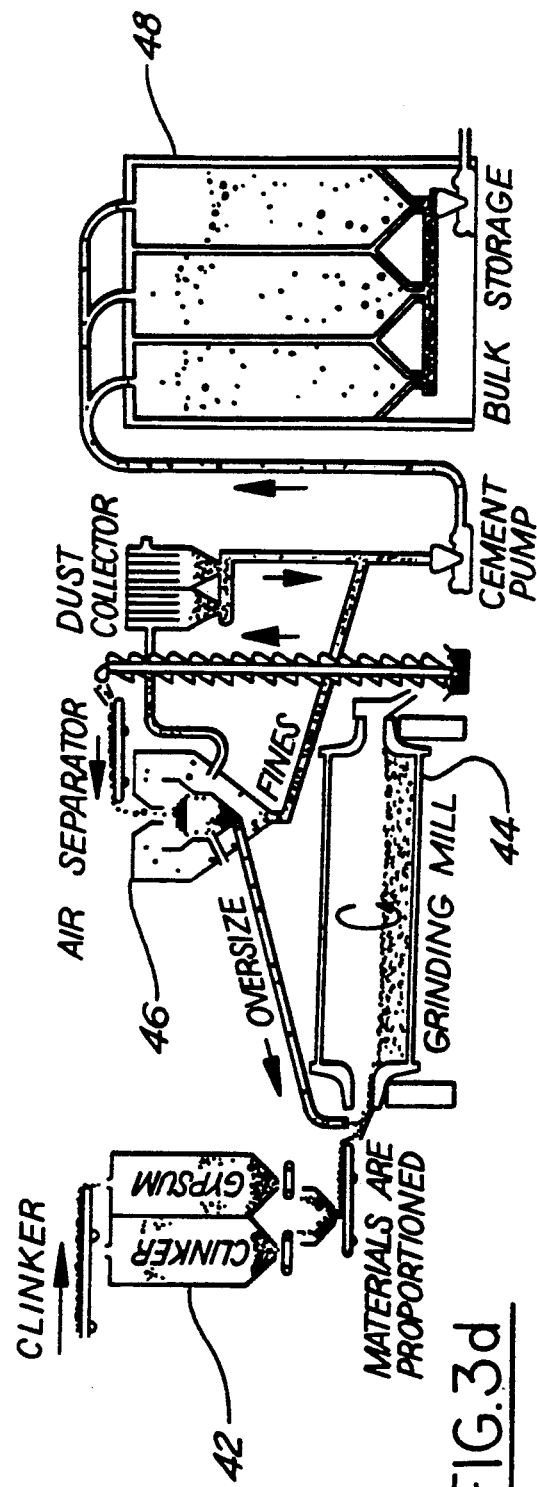
FIG. 3d is a schematic illustration of the clinker grinding and cement storage portion of a cement plant.

The clinker formed in the rotary kiln 38 is then transported through a series of conveyors 40 to a storage bin 42 illustrated in FIG. 3d. The clinker and gypsum are then mixed together and ground in grinding mill 44 to form cement which is totally free of petroleum product. The ground cement is sized utilizing an air separator to insure that only finely ground cement is pumped into the bulk storage bins 48.

SHALE DISPOSAL

In many areas of the country, particularly in the Midwestern United States, clay will make up a very large part of the earth removed from a remediated site. Cement plants in that geographic vicinity will typically utilize a wet process cement kiln due to the availability of clay. In other areas of the country, however, where clay is not really available and shale is common, shale is utilized in the formation of cement. Both shale and clay are comprised primarily of a mixture of $Al_2O_3$ and two to three parts of $SiO_2$. Clay typically has a significant amount of water, the actual amount of which varies. Shale, on the other hand, has little water, but frequently will contain, mica and other minerals. Shale, is quite porous and is capable of absorbing liquids. It is therefore necessary to remove shale contaminated with petroleum products when shale is present at the remediation site. Shale contaminated with petroleum products can be disposed of at a dry process cement plant. It also should be noted, however, that shale could be ground and mixed with water to form a fine slip and used in a wet process cement plant just as clay could be dried using a dry process cement plant.

Figure 4A:
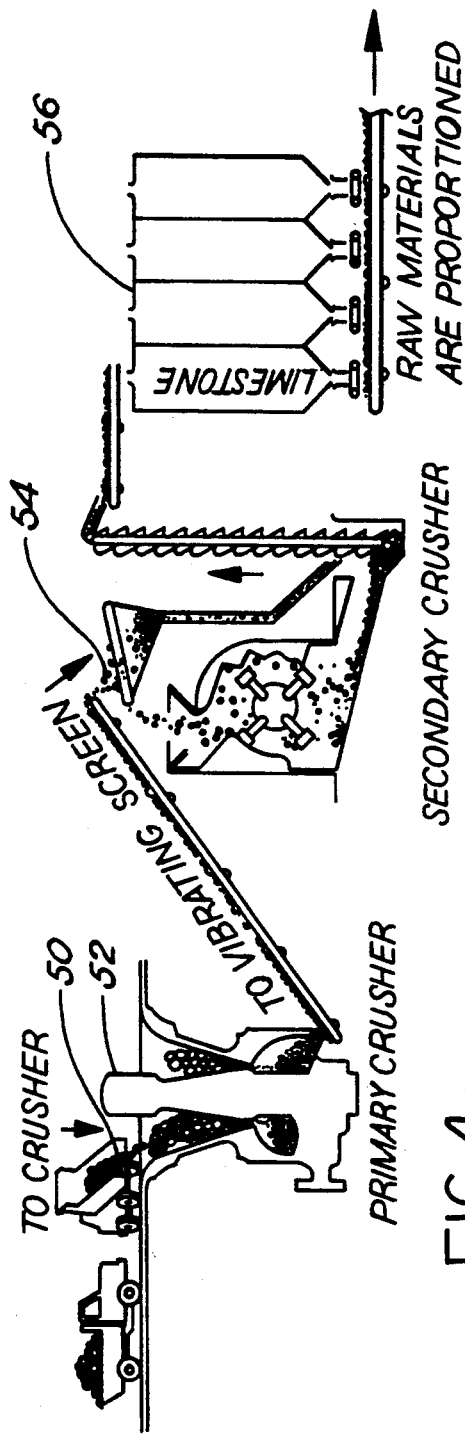
FIG. 4a is a schematic side illustration of the shale grinding and raw material storage portion of a dry process cement plant.
Figure 4B:
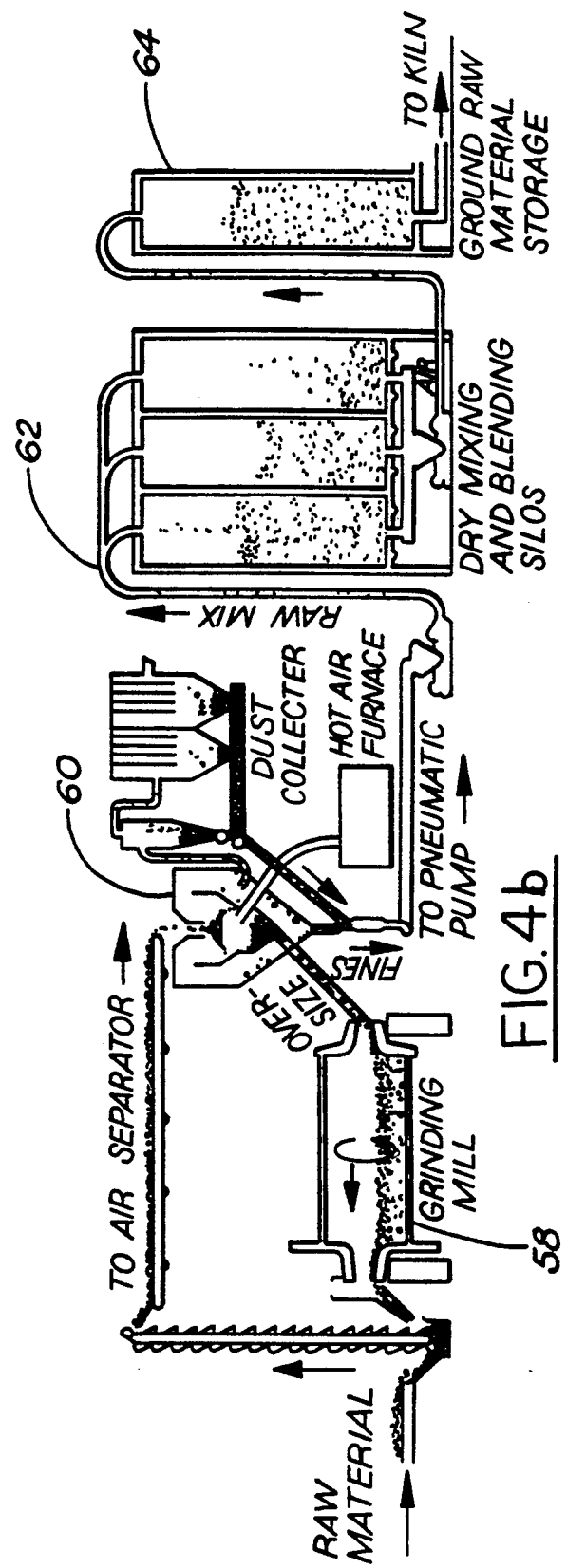
FIG. 4b is a schematic illustration of equipment for grinding and storing the dry feed mix in a dry process cement plant.

The dry process cement plant works substantially similar to a wet process plant, particularly in the area of the rotary kiln and the clinker processing equipment downstream thereof. The primary difference resides in the equipment for processing the raw material feed mix which is introduced into the kiln. FIG. 4a illustrates a truckload of shale 50 being deposited in primary crusher 52. The output of primary crusher will be rocks of approximately 5" size range. The primary crusher output will then be further crushed in a secondary crusher to reduce the shale to approximately the ¼" size range. The crushed granular shale is then stored in storage bins 56 along with other cement precursor raw materials. Next, the raw materials ar fed into grinding mill 58 where materials are ground together to form a dry feed mix. The ground mix is sized using an air separator 60. The finely ground mix is blended in a blending silo 62 and stored in a storage silo 64 waiting to be introduced into the rotary kiln. From a general standpoint, the rotary kiln illustrated in FIG. 3c and the clinker processing equipment illustrated in FIGS. 3d previously described, will be operated substantially similar to the rotary kiln and clinker processing equipment utilized in a dry process cement plant.

As one can appreciate from the description of this shale disposal process which utilizes the dry process cement plant, the clay disposal process using a wet process cement plant, are very similar. Both processes begin with digging up a LUST and the surrounded contaminated earth. The earth bearing a mixture of $Al_2O_3$ and $SiO_2$, i.e. clay or shale, are separated from the other materials. The $Al_2O_3 + SiO_2$ material is transported to a cement plant site and is mixed with other cement precursor materials and ground together to form a feed mix. This feed mix is introduced into a rotary cement kiln causing any remaining petroleum product contained therein to be volatilized and burned within the kiln as cement clinker is formed. Finally, the cement clinker is ground to form a cement which is free from petroleum products. Preferably, prior to this final grinding step, gypsum is added to the cement clinker so that the gypsum cement clinker can be simultaneously ground for the purposes of forming Portland cement.

SAND DISPOSAL

While the raw materials for making cement comprise primarily clay (or shale) and limestone, other materials such as silica sand and iron are needed in order to adjust the composition of the feed mix. Typically sand represents about 1% of the total feed mix on average. However, a very large modern cement plant can use as much as 10,000 tons of sand per year. It is therefore possible to dispose of a portion of the sand removed from LUST remediation sites which would otherwise be landfilled.

The amount of sand contaminated will generally exceed the needs of area cement plants. It is therefore believed that sand from remediation sites will only be utilized when the sand is clean and relatively free of other earthen materials.

The cement made utilizing the previously described processes, may be utilized just as any other the clay or shale material received from the various remedial sites for their organic content, this material can be handled just as other clay or shale received from conventional raw material mines.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed:

1. A process for disposing of earth contaminated with petroleum products from a leaking underground storage tank wherein the earth contains a significant amount of material comprised primarily of a mixture of one part $Al_2O_3$ and two to three parts $SiO_2$ ($Al_2O_3$ $SiO_2$ material), the process comprising:

digging up a leaking underground storage tank and the surrounding contaminated earth;

separating the excavated earth into a $Al_2O_3+SiO_2$ material and a non-$Al_2O_3+SiO_2$ material;

mixing the $Al_2O_3+SiO_2$ material and other cement precursor raw materials together to form a mixture, and grinding the mixture to form a feed mix;

introducing the feed mix into a rotary cement kiln causing any remaining petroleum product contained therein to be volatilized and burned within the kiln as cement clinker is being produced; and grinding the cement clinker together to form cement which is free of petroleum product.

2. The process of claim 1 further comprising separating sand from the non-$Al_2O_3+SiO_2$ material and adding sand to the mixing step to achieve the desired amount of $SiO_2$ in the feed mix.

3. The process of claim 2 further comprising transporting the unused non-$Al_2O_3+SiO_2$ material to a non-hazardous landfill.

4. The process of claim 1 further comprising transporting the non-$Al_2O_3+SiO_2$ material to a non-hazardous landfill.

5. The process of claim 1 wherein the petroleum products comprise, gasoline, fuel oil, diesel fuel or waste oil.

6. The process of claim 1 where the $Al_2O_3+SiO_2$ material comprises clay.

7. The process of claim 1 where the $Al_2O_3+SiO_2$ material comprises shale.

8. A process for disposing of clay containing soils contaminated with petroleum products from a leaking underground storage tank, the process comprising:

digging up a leaking underground storage tank and the surrounding contaminated soil;

separating the excavated soil into a clay and a non-clay soil groups;

transporting the non-clay soil to a non-hazardous land fill;

transporting the clay to a wet process cement plant site;

dispersing the clay in water and milling the water and clay in a centrifugal mill to form a clay slip;

mixing the clay slip with cement precursor raw materials and grinding the blended mixture together in the presence of water to form a feed slurry;

introducing the feed slurry into a rotary cement kiln causing the petroleum products therein to be volatilized and burned within the kiln as cement clinker is being produced; and grinding gypsum and the cement clinker together to form cement which is free of petroleum products.

9. The process of claim 8 wherein the petroleum products comprise gasoline, fuel oil, diesel fuel or waste oil.

10. A process for disposing of shale containing earth contaminated with petroleum products from a leaking underground storage tank, the process comprising:

digging up a leaking underground storage tank and the surrounding contaminated earth;

separating the excavated earth into a shale and a non-shale groups;

transporting the non-shale group to a non-hazardous land fill;

transporting the shale to a dry process cement plant site;

crushing the shale to form granular shale;

mixing the granular shale with other cement precursor raw materials and grinding the mixture together forming a dry feed mix;

introducing the dry feed mix into a rotary cement kiln causing any remaining petroleum products therein to be volatilized and burned as cement clinker is being produced; and grinding gypsum and the cement clinker together to form portland cement which is free of petroleum products.

11. The process of claim 10 wherein the petroleum products comprise gasoline, fuel oil, diesel fuel or waste oil.

* * * * *

UNITED STATES PATENT AND TRADEMARK OFFICE
CERTIFICATE OF CORRECTION

PATENT NO. : 5,236,283
DATED : August 17, 1993
INVENTOR(S) : Paul A. Ruehl

It is certified that error appears in the above-indentified patent and that said Letters Patent is hereby corrected as shown below:

Column 5, line 7, between "other" and "the" insert --cement. This process can be carried out at conventional existing cement plants without necessitating the installation of expensive emission control equipment. It should be further noted that there is no need to analyze--;

Column 5, line 25, Claim 1, line 7, after "$Al_2O_3$" insert -- + --.

Signed and Sealed this

Ninth Day of May, 1995

Attest:

BRUCE LEHMAN

*Attesting Officer*     Commissioner of Patents and Trademarks